May 13, 1969      E. H. LAND ET AL      3,443,855

VARIABLE POLARIZED LIGHT-FILTERING APPARATUS

Filed March 9, 1964      Sheet 1 of 2

INVENTORS
Edwin H. Land
and
Howard G. Rogers
BY Brown and Mikulka
and
Alvin Isaacs
ATTORNEYS May 13, 1969     E. H. LAND ET AL     3,443,855
VARIABLE POLARIZED LIGHT-FILTERING APPARATUS
Filed March 9, 1964     Sheet 2 of 2

INVENTORS
Edwin H. Land
and
Howard G. Rogers
BY Brown and Mikulka
and
Alvin Isaacs
ATTORNEYS

United States Patent Office 3,443,855
Patented May 13, 1969

3,443,855
VARIABLE POLARIZED LIGHT-FILTERING APPARATUS
Edwin H. Land, Cambridge, and Howard G. Rogers, Weston, Mass., assignors to Polaroid Corporation, Cambridge, Mass., a corporation of Delaware
Filed Mar. 9, 1964, Ser. No. 350,250
Int. Cl. G02f *1/26;* G02b *5/30, 27/28*
U.S. Cl. 350—150                                    14 Claims

ABSTRACT OF THE DISCLOSURE

Transmission of light is controlled by a variable light-filtering device which comprises sheet material adapted when stained to form a light polarizer and means for staining and destaining the sheet material whereby a light polarizer is selectively and reversibly formed.

---

This invention relates to light polarizers and, more particularly, to novel systems wherein light transmission is controlled by selectively and reversibly forming a light polarizer.

A primary object of the present invention is to provide a novel system for transmitting light under controlled conditions.

Another object is to provide a novel variable light filter.

Still another object is to provide a novel variable density window.

Yet another object is to provide a novel system for controlling the transmission of light by reversibly and selectively forming a light polarizer.

A further object is to provide a novel system wherein one or more molecularly oriented plastic materials are alternatively stained to form a light polarizer and destained to destroy its polarizing properties as a function of the light intensity.

A still further object is to provide a novel system for preventing windshield glare in vehicles.

Another object is to provide novel systems for image recordation and image translation.

Other objects of the invention will in part be obvious and will in part appear hereinafter.

The invention accordingly comprises the process involving the several steps and the relation and order of one or more of such steps with respect to each of the others, the apparatus possessing the construction, combination of elements and arrangement of parts, and the products possessing the features, properties and the relation of elements which are exemplified in the following detailed disclosure, and the scope of the application of which will be indicated in the claims.

For a fuller understanding of the nature and objects of the invention, reference should be had to the following detailed description taken in connection with the accompanying drawings wherein.

The use of light-polarizing materials in variable density windows, anti-glare headlight systems and the like has been heretofore known in the art. Broadly speaking, such materials absorb a portion of an incident light beam to reduce materially the intensity of light transmission.

As examples of light-polarizing materials and processes utilizing the same, mention may be made of U.S. Patents Nos. 2,237,567 and 2,328,219, issued to Edwin H. Land, which disclose polarizers prepared by staining a molecularly oriented plastic material so as to render the plastic material dichroic, e.g., polarizers formed by staining a molecularly oriented sheet of polyvinyl alcohol with iodine.

Generally speaking, when such polarizing materials are employed, that component of the incident beam which vibrates parallel to the long axes of the oriented molecules is absorbed, substantially wholly or in part, by the stained sheet, whereas the component vibrating perpendicular to the long axes of the molecules is transmitted by the sheet substantially without absorption.

By employing a pair of light-polarizing materials, the intensity of light transmitted thereby may be controlled accurately from a maximum possible transmission to total extinction or cut-off, depending upon the relationship of the polarizing or transmission axes of the respective polarizing materials. For example, when the polarizing axes of the two polarizing materials are parallel, a maximum of light is transmitted; whereas when the polarizing axes are crossed or at right angles, substantially complete cut-off may be obtained.

The present invention relates to novel systems utilizing the principles of polarizers to control the amount or intensity of light transmission.

More particularly, according to the present invention, the amount of radiation transmitted through means normally at least partially transparent to the radiation is controlled by associating with said means a suitably molecularly oriented plastic material and a staining material suitable for causing the molecularly oriented plastic material to become a polarizer. The staining material is present in such a form as to be non-active, e.g., non-staining, until a flow of electrons from an appropriate source of current effects a change in the staining material, whereby when the electrons are caused to flow in one direction the staining material is caused to be deposited in proximity to the molecularly oriented plastic material in an active form, so as to form a polarizer, while a flow of electrons in the reverse direction will cause the staining material to revert to its non-active form, i.e., destain the plastic material. In other words, the amount of radiation transmitted is controlled by reversibly or alternately forming and "destroying" a polarizing material according to the degree or amount of transmission desired.

The invention will best be understood by reference to the illustrative drawings.

Figure 1:
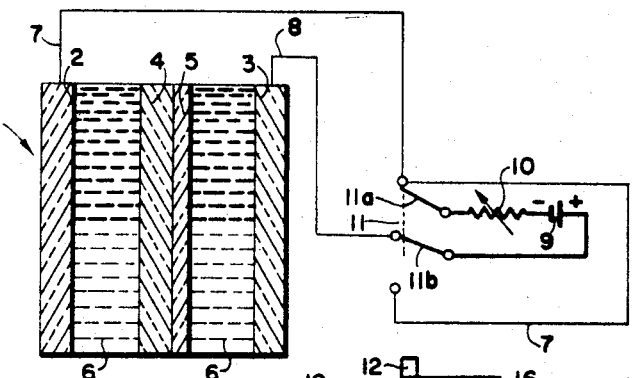
FIGURE 1 is a diagrammatic view illustrating one embodiment of this invention.

As shown in FIGURE 1, the variable light filter or light transmission controlling means 1 comprises a pair of transparent electrodes 2 and 3, a sheet material 4 capable, upon staining, of forming a polarizer and provided with a transparent non-staining backing 5 which precludes staining on one surface of said sheet material, and an electrolytic solution containing a substance capable, under conditions to be described with more particularity hereinafter, of staining said sheet material to render it light-polarizing.

Electrodes 2 and 3 may comprise any of the transparent electrodes heretofore known in the art, e.g., transparent bases having a thin coating of a conducting metal such as gold, fine mesh screens of one of the noble metals, electrically conducting glass, such as Nesa (trademark of Pittsburgh Plate Glass Co., for an electrically conductive transparent glass), Electrapane (trademark of Libby-Owens-Ford Glass Co., for an electrical conducting glass coated with a transparent conducting oxide film), etc.

Sheet material 4 may comprise one of the molecularly oriented plastic materials previously employed in the preparation of polarizers, e.g., materials such as molecularly oriented polyvinyl alcohol and the cellulosic materials which are referred to in the aforementioned patents to Edwin H. Land. Useful transparent non-staining backings such as cellulose acetate will be readily suggestive to those skilled in the art.

Electrolytic solution 6 comprises a solution of an ionizable material capable, upon impressing a suitable electric current, of providing ions which will stain sheet material 4 to render it light-polarizing. As examples of useful ionzibale materials, mention may be made of iodides such as potassium iodide which, upon impressing an electric current, will generate iodine. Other useful ionizable materials, e.g., ionizable dyes, inorganic salts and the like useful in staining sheet material 4 to form a polarizer will be readily suggested. The solvent may be water, an organic liquid, or mixtures of such solvents. If desired, the electrolytic solution may also contain suitable viscosity increasing reagents, e.g., carboxymethyl cellulose, hydroxyethyl cellulose, etc.

Electrodes 2 and 3 are connected to a suitable source of electric current by leads 7 and 8 respectively. As shown in FIGURE 1, the source of current may comprise a battery 9. Resistor 10 is preferably but not necessarily provided in order to regulate the amount of current. The terminal ends of leads 7 and 8 make contact with double switch 11 to complete the circuit.

In operation, when the switch is in the "up" position, as shown in FIGURE 1, current is caused to flow from the battery 9, through switch 11b to lead 8, whereby electrode 3 becomes the anode and electrode 2 the cathode. (Naturally, switch 11a contacts electrode 7 to complete the circuit.) This in turn causes the staining ions in electrolytic solution 6, e.g., iodide ions, to flow away from electrode 2 and towards sheet material 4, thereby effecting the staining necessary to cause sheet material 4 to exhibit polarizing properties. When switch 11 is reversed, e.g., thrown into the "down" position, the flow of current is reversed, so that current now flows from switch 11b through lead 7 to electrode 2, which in turn reverses the polarity of the two electrodes, causing the iodide ions to migrate away from sheet material 4 towards electrode 2.

The purpose of transparent non-straining backing 5 will now be apparent. This backing prevents iodide ions migrating from electrode 3 towards electrode 2 from staining the surface of sheet material 4 nearest thereto.

It will therefore be seen that the reversal of the flow of current causes destaining which in turn "destroys" the polarizing properties of sheet material 4.

From the foregoing description, it will be noted that the present invention provides a reversible system for forming and "destroying" a polarizer according to the direction of current impressed upon the filtering device.

While the direction of current may be controlled manually, it may be controlled automatically, e.g., by means such as is illustrated in FIGURE 1.

As shown in FIGURE 1, this automatic means may comprise a solenoid 12, photoconductive cell 13, battery or other source of current 14, and a resistor 15 connected in series by means of leads 16, 17, 18 and 19.

As is well known in the art, cell 13 and resistor 15 cooperate to control the amount of current flowing to solenoid 12. When the current is of a predetermined amount, e.g., when photoconductive cell 13 records a low intensity of light, solenoid 12 causes switch 11 to drop to the "down" position, thereby "destroying" the polarizing properties of sheet material 4.

It will be appreciated that filtering device 1 is not limited to the specific configuration shown in FIGURE 1.

Figure 2:
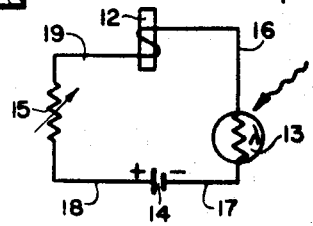
FIG. 2 is a similar view illustrating another embodiment of the invention.
Figure 2:
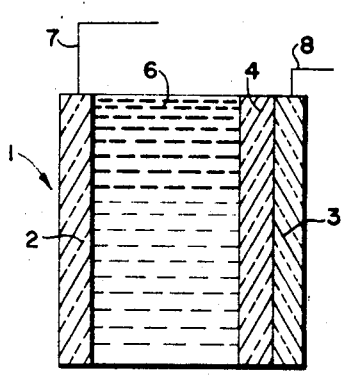

For example, sheet material 4 may be contiguous and in intimate contact with one of the electrodes, as shown in FIG. 2, thereby obviating the necessity of providing a non-staining backing.

It is also contemplated that filtering device 1 may contain two or more molecularly oriented plastic materials, at least one of which is capable of exhibiting polarizing properties by impressing a suitable current in the manner heretofore described. In one such system, two molecularly oriented sheet materials are so positioned that when both are caused to exhibit polarizing properties the axis of polarization of one polarizer is at right angles to the axis of polarizatin of the other, thereby permitting a minimal amount of light to be transmitted through the filtering device.

Figure 3:
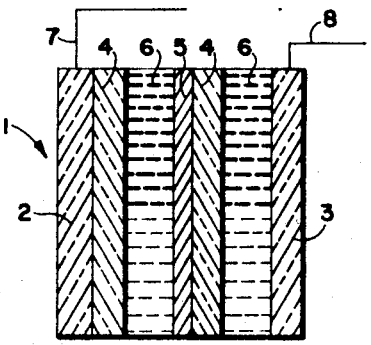
FIG. 3 is a similar view illustrating still another embodiment of the invention.
Figure 4:
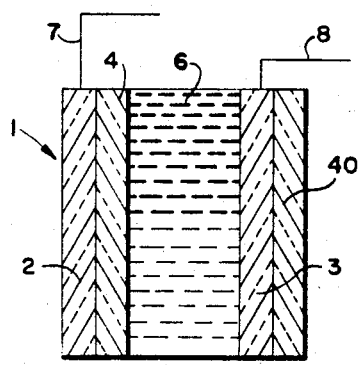
FIG. 4 is a similar view of a still further embodiment of the invention.

Filtering devices of this description are exemplified in FIGS. 3 and 4.

In the filtering device of FIG. 3, a pair of molecularly oriented sheet materials 4 are provided. These sheet materials may be so positioned that when they are caused to exhibit polarizing properties in the manner heretofore described, the axis of polarization of one will be at 90° to the axis of polarization of the other to provide substantially total extinction or cut-off. Leads 7 and 8 are connected to a suitable source of current as illustrated in FIGURE 1.

When the current flows to electrode 2, causing it to become the anode, the staining ions, e.g., the iodide ions, stain both sheet materials 4 to provide a pair of polarizers with crossed axes of polarization. When the current flows in the opposite direction, both are destained, thereby "destroying" the polarizing properties of both sheet materials. Backing 5, as previously mentioned, precludes staining of the opposite surface of the sheet material 4 to which it is associated.

In the embodiment illustrated in FIG. 4, a polarizer 40 is provided on the side of the electrode not in contact with the electrolytic solution. In this manner, polarizer 40 is protected from the deleterious effects of the electrolytic solution and the consequent flow of ions resulting from impressing the current. It will be appreciated however that where found desirable or expedient to do so, polarizer 40 may be placed on the other side of the electrode, provided of course that the polarizer is not adversely affected by the electrolytic solution. Preferably, in such a variation, polarizer 40 is formed by staining a molecularly oriented plastic material with a dye or other colorant which is non-ionic and which is chemically inert to the ingredients of the electrolytic solution.

In the embodiment illustrated in FIG. 4, it will be seen that there are provided a pair of sheet materials, one of which 40 is a polarizer unaffected by the reaction conditions, the other 4 being a material which is or is not a polarizer, depending upon the direction of the flow of current.

In the illustrative variable filters heretofore described, a pair of parallel electrodes have been employed. In lieu of this arrangement, the electrodes may obviously be in different relationship to one another, e.g., perpendicular to one another, one electrode coiled around or surrounding the other with the electrolyte therebetween, etc. Suitable transparent means may be employed to confine the electrolyte. It is also contemplated that systems having more than two electrodes may be employed. Such variations are illustrated in the variable filter shown in FIG. 5.

As shown therein, three electrodes, 2, 2a and 3a are employed transparent electrodes 2 and 2a are substantially parallel to one another while electrode 3a is substantially perpendicular to the other two electrodes. As electrode 3a is out of the field of transmittancy or aperture of the filter, it need not be transparent.

As in the embodiments illustrated in FIGS. 1–4, leads 7 and 8 are connected to a suitable source of current. Lead 7a from electrode 2a is in electrical contact with lead 7 so that electrodes 2 and 2a are always of the same potential.

A molecularly oriented plastic sheet material 4 is positioned at each of electrodes 2 and 2a with their potential axes of polarization at a predetermined desired angle, for example, at right angles for potential total cut-off of light.

When current is impressed so that electrodes 2 and 2a are anodes, a pair of light polarizers are formed having their axes of polarization at the aforementioned predetermined angle.

When the flow of current is reversed, both polarizers are "destroyed," so that the variable filter is substantially transparent.

Figure 5:
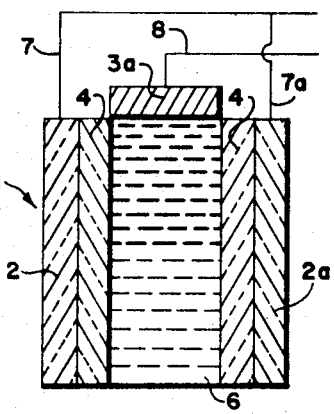
FIG. 5 is a similar view of yet another embodiment of this invention.

By employing suitable wiring, the variable filter of FIG. 5 is capable of providing a pair of polarizers or a single polarizer having a predetermined axis of polarization.

For example, by means of suitable switches and the like (not shown), which may be controlled either manually or automatically, either of electrodes 2 and 2a may be disconnected to provide, in effect, a two-electrode system. Thus, it is possible to provide: (1) a polarizer at each of electrodes 2 and 2a; (2) a polarizer only at electrode 2; or (3) a polarizer only at electrode 2a.

The advantages of such a system will be readily apparent to those skilled in the art.

In view of the foregoing illustrative embodiments, other variations in the structure and/or the arrangement of elements of the novel filtering device of this invention will be readily suggested to those skilled in the art.

Accordingly, it is to be expressly understood that the invention is not limited to the specific filters described and illustrated in FIGS. 1–5.

The filtering devices of this invention are capable of the variety of different uses in which polarizers have heretofore been employed. However, unlike prior devices, the variable filter of the present invention provides a system for continuously and automatically staining and destaining a material to provide in turn a system for reversibly forming and destroying a light polarizer, according to the intensity of transmitted light desired.

The present invention may be employed in variable density windows for controlling the amount of light entering a room or other enclosure. For example, where it is desired that the amount of sunlight entering a room be kept rather constant to prevent glare or eye discomfort resulting from sudden changes in brightness due to variations in light transmission from an external source, e.g., sunlight, the device of the present invention may be preset to control and maintain automatically at a relatively constant level the amount of light transmission. Thus, in maximum brightness, a maximum amount of current is generated to provide a polarizer or pair of polarizers of maximum light absorption characteristics. Conversely, in minimal brightness, the flow of current is automatically reversed to render the filtering device instantaneously light transmittant. At intermediate levels of light intensity, the amount of current generated is proportionately less than maximum to provide one or a pair of polarizers exhibiting light-polarizing properties correspondingly less than the maximum obtainable.

Figure 6:
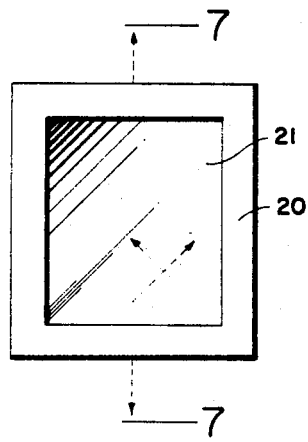
FIG. 6 is a plan view illustrating a variable density window prepared in accordance with the present invention.
Figure 7:
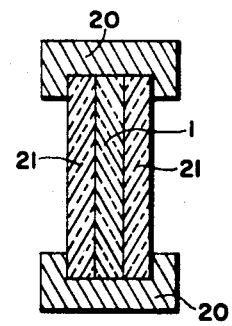
FIG. 7 is a partially schematic vertical sectional view taken along lines 7—7 of FIG. 6.

A typical variable density window of the foregoing description is illustrated in FIGS. 6 and 7.

As shown therein, the variable density window comprises a recessed or grooved frame or mount 20 of a suitable non-conductive material such as wood confining the novel filtering device 1 of this invention sandwiched or laminated between a pair of transparent non-conductive protecting plates 21 of glass or other transparent plastic. It will be appreciated that filter 1 is connected to a suitable source of current by leads (not shown) passing through frame 20.

Preferably, filter 1 comprises a double polarizer system such as is exemplified in FIGS. 3–5 in which the polarizers are positioned so that their respective transmission axes are relatively perpendicular and at angles of 45° to the vertical, as is indicated by the broken arrows in FIG. 6.

Where found expedient or desirable to do so, filter 1 and plates 21 may be laminated together at the top and bottom by means of a suitable bonding material to provide a unitary structure. Suitable bonding materials such as plasticized, polymerized, incomplete polyvinyl acetal resin, vinyl acetate, methyl methacrylate, etc., will be readily suggested to those skilled in the art.

While double polarizer systems have been mentioned in order to illustrate the invention, systems employing a single polarizer, such as illustrated in FIGS. 1 and 2, may also be employed, particularly where a second polarizer is employed at some position external to the variable density window. It is also contemplated that a pair of filtering devices, each with its own protective plate or plates, may be provided on either side of frame 20. In that event, the two elements may have an air space therebetween.

Other variations and modifications will be apparent.

A variable density window of the foregoing description may be used to control the light transmitted into various enclosures other than a room. For example, the variable density window of this invention is potentially useful in photographic devices to control the intensity of light in accordance with the brightness of the scene. Such a system makes it potentially possible to expose a photosensitive element confined therein over a wider range of light intensities than has heretofore been possible.

The present invention is also particularly useful in systems for providing glare-free windshields. Systems employing polarizing windshields to protect the occupants of a vehicle from the glare of oncoming headlights are well known in the art and are disclosed, for example, in U.S. Patent Nos. 2,031,045, 2,087,795 and 2,440,133.

Essentially, such systems employ a polarizer in the windshield and a polarizer in the headlamps, each having the same axis of polarization forming approximately a 45° angle with the vertical.

With two vehicles equipped in this manner approaching from opposite directions, the headlamp polarizer of one vehicle would have its axis of polarization perpendicular to that of the windshield polarizer of the second vehicle.

In this case, the light from one's own headlamps would be visible through the windshield, while the glare from oncoming headlights would be eliminated. However, a windshield provided with a polarizer in the manner heretofore known in the art has the inherent disadvantage of tending to obscure vision in certain instances by decreasing the intensity of transmitted radiation at times when the maximum intensity of transmitted radiation is desirable.

The present invention obviates this inherent disadvantage by providing a system whereby a normally transparent windshield may be rendered light-polarizing only at desired intervals, e.g., when it is desirable to prevent glare from oncoming headlights.

Figure 8:
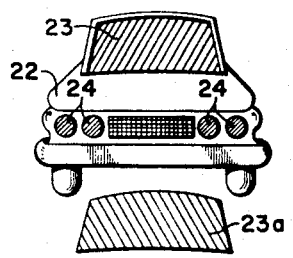
FIG. 8 is a partly perspective, partly schematic view illustrating the use of this invention to provide glare-free windshields.

FIG. 8 illustrates the use of this invention in anti-glare systems for vehicles.

A vehicle 22 has its windshield 23 provided with a filter device such as is illustrated in FIGS. 1, 2 and 6 having a single sheet material capable of exhibiting light polarizing properties when current is impressed in a given direction actuated automatically by the intensity of light emanating from the headlights of an oncoming vehicle. The headlamps of vehicle 22 are also provided with polarizing units which may be the conventional polarizers heretofore suggested for such usage. For example, the polarizing units in the headlamps may be high transmission polarizers such as are described and claimed in the copending application of Howard G. Rogers, Ser. No. 168,398, filed Jan. 24, 1962 now U.S. Patent No. 3,213,753 issued Oct. 26, 1965. The polarizing units may also be the reversible polarizers of the present invention. The axes of polarization of the respective polarizers are the same and are approximately at a 45° angle to the vertical as shown by the diagonal lines.

The windshield 23a of a second vehicle equipped in similar manner would have a variable filter having an axis of polarization (viewed from within) as shown by the diagonal lines. In other words, the axis of polarization of the windshield of one vehicle will have an axis of polarization perpendicular to that of the headlamps (and windshield) of a second vehicle approaching from the opposite direction.

In the manner heretofore described, the light emanating from the approaching headlamps and striking the photoconductive cell of the filtering device would automatically and instantaneously cause the sheet material in the light filter in the windshield element to be stained, whereby it exhibits polarizing properties to eliminate the glare from the oncoming vehicle. When the vehicle has passed, the process is automatically and instantaneously reversed, causing destaining and hence destruction of the polarizing properties.

It is also contemplated that the variable filter device associated with the windshield may also contain at least a second sheet material capable of providing a polarizer with its axis of polarization vertical, so as also to reduce glare from sunlight reflected off the road surface. In such a system, the variable filters of FIGS. 3–5 are particularly useful.

The present invention is also useful in electrolytic photographic processes for preparing polarizing images.

Figure 9:
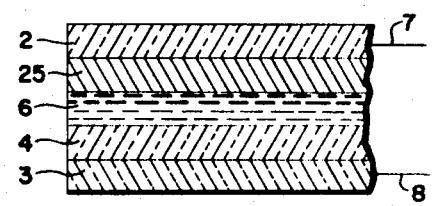
FIG. 9 is a partially diagrammatic, partially sectional view illustrating the use of the present invention in elements for preparing visible images.
Figure 10:
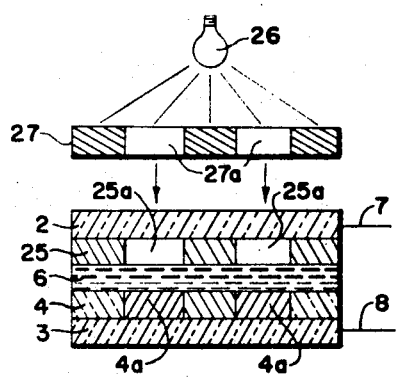
FIG. 10 is a similar view showing the preparation of a polarizing image with the element of FIG. 8.

FIGS. 9 and 10 illustrate this aspect of the present invention.

As shown in FIG. 9, a photographic unit of this invention may comprise, in order, a first transparent electrode 2, a photoconductor layer 25, electrolytic solution 6, molecularly oriented plastic sheet material 4, and a second electrode 3. Electrodes 2 and 3 are provided with leads 7 and 8.

Photoconductor layer 25 comprises a layer of a photoconductive material, e.g., a material which is rendered molecularly conductive in its transverse direction only upon exposure to light. Materials having this characteristic and their preparation are well known in the art and, per se, comprise no part of the present invention. As examples of such materials, mention may be made of cadmium sulfide, zinc oxide, selenium, etc.

FIG. 10 illustrates the use of the photographic unit of FIG. 9.

A document 27 or other object to be reproduced, having transparent areas 27a, is placed between a suitable source of light 26 and the photographic unit. Light passing through areas 27a renders corresponding areas 25a of photoconductive layer 25 electrically conductive. In other words, layer 25 is rendered electrically conductive in terms of exposed areas, while unexposed areas remain non-conductive. This imagewise conductivity is employed to provide a visible image in the following manner.

When electric current is impressed, the imagewise migration of the staining ions in electrolyte 6 causes an imagewise staining of areas 4a of plastic material 4, thereby rendering material 4 light-polarizing in terms of exposed areas 25a of photoconductive layer 25 or in terms of transparent areas 27a of the subject matter.

Subsequent to image formation, the current may either be left on or switched off to provide a polarizing image.

The polarizing image prepared in the foregoing manner may be viewed and/or employed in the various manners heretofore known in the art. For example, the polarizing image prepared in accordance with this invention, when viewed by ordinary light, may be of such low contrast as to be faint or even substantially invisible, yet when viewed through a polarizer or analyzer the polarizing axis of which is crossed with that of the polarizing surface on which the image is formed, the shadow or gray areas of the image become appreciably darker and the resulting image then becomes vividly apparent to the viewer.

In known manner stereoscopic images may also be formed by superimposing a pair of polarizing images with the polarizing axis of one at right angles with the polarizing axis of the other. Likewise, two such images, one a right-eye image, the other a left-eye image, may be projected upon a suitable viewing screen where the images are superimposed and viewed through polarizing analyzers. As is well known in the art, a pair of analyzers may be employed, one positioned adjacent the left eye of an observer and the other positioned adjacent the right eye of the observer with the axes of the two analyzers being positioned so that the observer will see with his left eye only the left-eye image and with his right eye only the right-eye image. A stereoscopic effect is thus obtained. Thus the polarizing images may be directly viewed by an observer equipped with a suitable analyzing device or they may be projected upon a suitable nondepolarizing screen and viewed by many observers equipped with suitable analyzers.

The various methods of viewing polarizing images and the uses to which such images may be subjected, as heretofore noted, are well known in are art and certain of these viewing procedures and the uses thereof are described with more particularity in U.S. Patent No. 2,203,687.

Various changes may be made in the structure of the photographic unit illustrated in FIG. 9 without departing from the scope of the invention.

For example, it is contemplated that a metal layer could be placed on the back of the photoconductive layer to facilitate viewing of the reflection. It is also contemplated that a light-absorbing element could be placed between electrode 3 and the photoconductive layer to prevent unwanted changes in conductivity of layer 25 resulting from viewing light entering the back of the photographic unit through electrode 3. The prevention of viewing light entering the back of the unit and a suitable background for viewing by reflected light may also be obtained by including an opaque pigment, preferably black, in the electrolytic solution.

The polarizing image prepared in the foregoing manner may be "erased" by subjecting photoconductive layer 25 to an overall exposure which would cause uniform staining of sheet material 4 to render it uniformly light-polarizing. Reversal of the direction of current flow would then destain sheet material 4, thereby "destroying" its light-polarizing properties. Although the image has been "erased," a new image may be formed and the unit used repeatedly.

In the foregoing description of the many uses of the novel variable filter of this invention, a single such filter has been employed. It is contemplated that a plurality of such filters may be employed if desired. For example, two or more filters may be connected in series to provide increased filtering capabilities.

While the present invention has been described in terms of providing a variable filter for visible light, it will be apparent that it may also be adapted for use in systems requiring the control of nonvisible light, e.g., infrared or ultraviolet light.

Since certain changes may be made in the above, apparatus, product and process without departing from the scope of the invention herein involved, it is intended that all matter contained in the above description or shown in the acocmpanying drawings shall be interpreted as illustrative and not in a limiting sense.

What is claimed is:
1. A light-filtering device comprising sheet material means capable of forming a light polarizer when stained; an electrolytic solution in contact with one surface of said sheet material means and containing means activated by the flow of an electric current for staining said sheet material means to render it light polarizing; and means for flowing an electric current in a predetermined direction through said solution.

2. A variable light-filtering device comprising a first light-transmitting electrode; a second light-transmitting electrode parallel to, coextensive with, and spaced apart from said first electrode; an electrolytic solution confined between said electrodes, a light transmitting sheet material means capable of forming a light polarizer when stained, parallel to, substantially coextensive with and positioned between said electrodes, said sheet material means having only one of its surfaces in direct contact with said electrolytic solution, said solution containing means activated by the flow of an electric current for staining said surface of said sheet; means for flowing an electric current in a predetermined direction through said device; and means for reversing the direction of the flow of current.

3. A device as defined in claim 2 including means for automatically predetermining said direction of flow.

4. A device as defined in claim 2 wherein said sheet material means is positioned in spaced relationship to each of said electrodes and is provided on one of its surfaces with a non-staining light transmitting backing.

5. A device as defined in claim 2 wherein said sheet material means has one surface in juxtaposition with the inner surface of one of said electrodes.

6. A device as defined in claim 5 including a second light transmitting sheet material means capable of forming a polarizer when stained, parallel to and coextensive with said first-mentioned sheet material and positioned between and in spaced relationship to each of said electrodes, said second sheet material being provided on its surface facing said first-mentioned sheet material with a non-staining light transmitting backing.

7. A device as defined in claim 5 including a pre-stained, non-reversible, light-polarizing sheet material parallel to and substantially coextensive with said first-mentioned sheet and having one surface in juxtaposition with the outer surface of the other of said electrodes.

8. A device as defined in claim 5 including a second light transmitting sheet material means capable of forming a light polarizer when stained, parallel to and coextensive with said first-mentioned sheet material, in juxtaposition with the inner surface of the other of said electrodes, a third electrode in contact with said electrolytic solution and positioned outside and substantially adjacent the field of light transmittancy of said first and second light-transmitting electrodes, and means for maintaining said first and second light-transmitting electrodes at the same potential and said third electrode at a different potential.

9. A device as defined in claim 2 wherein said sheet material means comprises molecularly oriented plastic material and said electrolytic solution contains ions for staining said plastic material to render it light-polarizing.

10. In an enclosure provided with transparent means for emitting light from an external source into said enclosure, the improvement which comprises positioning in coextensive relationship with said transparent means, a light-filtering device as defined in claim 2.

11. In a vehicle having at least one headlamp and a windshield, said vehicle headlamp containing light-polarizing means, the improvement which comprises positioning in coextensive relationship with said windshield a light-filtering device as defined in claim 2.

12. A vehicle as defined in claim 11 wherein said headlamp light-polarizing means comprises a first light-transmitting electrode; a second light-transmitting electrode parallel to, coextensive with, and spaced apart from said first electrode; an electrolytic solution confined between said electrodes, light transmitting sheet material means capable of forming a light polarizer when stained, parallel to, substantially coextensive with and positioned between said electrodes, said sheet material means having only one of its surfaces in direct contact with said electrolytic solution, said solution containing means activated by the flow of an electric current for staining said surface of said sheet; means for flowing an electric current in a predetermined direction through said device; and means for reversing the direction of the flow of current.

13. A process for controlling the amount of light transmitted through a substantially transparent window-like member which comprises positioning in coextensive relationship with said member at least one sheet of light transmitting oriented plastic material, alternatively forming at least one light polarizer in said member by staining at least one of said sheets of plastic material when the intensity of said light is relatively great and destroying said light polarizer at least in part by destaining said sheet of plastic material when said light intensity diminishes to a predetermined level, thereby maintaining at a predetermined level the intensity of light transmitted.

14. A process for controlling the amount of light entering an enclosure through a substantially transparent window-like member which comprises positioning in coextensive relationship with said member at least one light-polarizing material which absorbs at least a portion of said light; destroying the light-polarizing properties of said material whereby said material is rendered substantially light-transmittant for a predetermined amount of time; and thereafter restoring the light-polarizing properties of said material.

References Cited

UNITED STATES PATENTS

| 1,955,923 | 4/1934 | Land | 350—150 X |
| 2,230,262 | 2/1941 | Pollack | 350—156 X |
| 2,299,906 | 10/1942 | Land | 350—155 X |
| 3,153,113 | 10/1964 | Flanagan et al. | 350—160 |
| 3,190,177 | 6/1965 | Kaprelian | 350—160 |
| 3,257,903 | 6/1966 | Marks. | |

DAVID SCHONBERG, *Primary Examiner.*

P. R. MILLER, *Assistant Examiner.*

U.S. Cl. X.R.

350—147, 154, 157, 160